United States Patent
Jiang et al.

(10) Patent No.: US 11,481,268 B2
(45) Date of Patent: Oct. 25, 2022

(54) BLOCKCHAIN MANAGEMENT OF PROVISIONING FAILURES

(71) Applicant: International Business Machines Corporation, Armonk, NY (US)

(72) Inventors: Jing Bo Jiang, Beijing (CN); Li Ni Zhang, Beijing (CN); Li Long Chen, Beijing (CN); Yu Zhao, Beijing (CN); Wen Rui Zhao, Beijing (CN); Lan Luo, Beijing (CN); Li Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/983,163

(22) Filed: Aug. 3, 2020

(65) Prior Publication Data
US 2022/0035693 A1 Feb. 3, 2022

(51) Int. Cl.
G06F 11/00 (2006.01)
G06F 11/07 (2006.01)
G06F 16/23 (2019.01)
G06F 9/54 (2006.01)

(52) U.S. Cl.
CPC ........... G06F 11/079 (2013.01); G06F 9/541 (2013.01); G06F 11/0751 (2013.01); G06F 16/2379 (2019.01)

(58) Field of Classification Search
CPC ............... G06F 11/079; G06F 11/0709; G06F 11/0712; G06F 11/0751; G06F 11/3055; G06F 11/3058; G06F 11/3089
See application file for complete search history.

(56) References Cited

U.S. PATENT DOCUMENTS 11,055,675 B2 * 7/2021 Pustizzi ............... G06Q 20/204
2015/0220408 A1 8/2015 Jaisinghani
2017/0331668 A1 11/2017 Prathipati et al.
(Continued)

FOREIGN PATENT DOCUMENTS

CN 108804239 A 11/2018
CN 110022343 A 7/2019
(Continued)

OTHER PUBLICATIONS

"Patent Cooperation Treaty PCT International Search Report", Applicant's File Reference: IEE210422PCT, International Application No. PCT/CN2021/102382, International Filing Date: Jun. 25, 2021, dated Sep. 29, 2021, 9 pages.
(Continued)

*Primary Examiner* — Elmira Mehrmanesh
(74) *Attorney, Agent, or Firm* — Stephanie L. Carusillo (57) ABSTRACT

In an approach to blockchain management of cloud service provisioning failures, one or more computer processors capture one or more application programming interface (API) calls associated with a service provision. One or more computer processors submit the captured one or more API calls to a blockchain ledger. One or more computer processors detect a system failure during the service provision. One or more computer processors extract the submitted one or more API calls from the blockchain ledger. Based on the extracted one or more API calls, one or more computer processors identify a problematic system associated with the system failure.

20 Claims, 6 Drawing Sheets

(56) References Cited

U.S. PATENT DOCUMENTS

| | | | |
|---|---|---|---|
| 2018/0219883 A1* | 8/2018 | Li | H04L 63/1441 |
| 2018/0268151 A1* | 9/2018 | Cuomo | H04L 9/3297 |
| 2019/0018984 A1* | 1/2019 | Setty | H04L 63/14 |
| 2019/0102409 A1* | 4/2019 | Shi | G06F 16/27 |
| 2019/0104196 A1* | 4/2019 | Li | H04L 9/3239 |
| 2019/0251555 A1 | 8/2019 | McCormick | |
| 2019/0356469 A1* | 11/2019 | Deshpande | H04L 9/0643 |
| 2020/0341834 A1* | 10/2020 | Safary | G06F 11/2257 |
| 2021/0337023 A1* | 10/2021 | Yang | H04L 63/00 |

FOREIGN PATENT DOCUMENTS

| | | |
|---|---|---|
| CN | 110162559 A | 8/2019 |
| WO | 2017090041 A1 | 6/2017 |

OTHER PUBLICATIONS

"Identifying Cascading Cloud Failure Root Cause with Block Chaining", Disclosed Anonymously, An IP.com Prior Art Database Technical Disclosure, IP.com No. IPCOM000253510D, IP.com Electronic Publication Date: Apr. 5, 2018, 6 pages.

Gill et al., "RADAR: Self-configuring and self-healing in resource management for enhancing quality of cloud services", Wiley, Jul. 6, 2016, DOI: 10.1002/cpe.4834, 29 pages, <https://onlinelibrary.wiley.com/doi/pdf/10.1002/cpe.4834>.

Javadi et al., "Hybrid Cloud Resource Provisioning Policy in the Presence of Resource Failures", Proceedings of the 4th International Conference on Cloud Computing Technology and Science (CLOSER 2014), Apr. 3-5, 2014, Barcelona, Spain, 8 pages, <https://ieeexplore.ieee.org/document/6427521>.

Mell et al., "The NIST Definition of Cloud Computing", Recommendations of the National Institute of Standards and Technology, Special Publication 800-145, Sep. 2011, 7 pages.

Shrivastava et al., "A workflow and agent based platform for service provisioning", Proceedings of the Fourth International Enterprise Distributed Object Computing Conference (EDOC), Sep. 25-28, 2000, Makuhari, Japan, 10 pages.

Vijayalakshmi et al., "Automatic Healing of Services in Cloud Computing Environment" Proceedings of the 2016 International Conference on Advanced Communication Control and Computing Technologies (ICACCCT), May 25-27, 2016, Ramanathapuram, India, 6 pages.

* cited by examiner

BLOCKCHAIN MANAGEMENT OF PROVISIONING FAILURES

BACKGROUND OF THE INVENTION

The present invention relates generally to the field of cloud service provisioning, and more particularly to blockchain management of cloud service provisioning failures.

A blockchain is a decentralized and distributed digital ledger that can record transactions between two or more parties efficiently and in a verifiable and permanent way. The ledger itself can also be programmed to trigger transactions automatically. A blockchain maintains a continuously growing list of records, called blocks, secured from tampering and revision. Each block contains a timestamp and a link to a previous block. By design, blockchains are inherently resistant to modification of the data—once recorded, the data in a block cannot be altered retroactively. Using a peer-to-peer network and a distributed timestamping server, a blockchain database is managed autonomously. The decentralized consensus algorithm of blockchain technologies allows several entities to maintain a shared record of information without having to trust each other individually, since consensus is formed on a per-network basis. The networked model produces a system with the advantages of censorship resistance, tamper resistance, and a system with no single point of failure.

With the continual growth of digital information, there is an ever-increasing reliance on cloud computing. Cloud computing is a model for enabling convenient, on-demand network access to a shared pool of configurable computing resources (e.g., servers, storage, applications, and services) that can be rapidly provisioned and released with minimal management effort. The availability of low-cost computers and storage devices, as well as the widespread adoption of hardware virtualization and service-oriented architecture, have led to a growth in cloud computing. The scalability offered by cloud computing enables users to scale up as computing needs increase and then scale down again as demands decrease.

Recently, use of the cloud and cloud-based service provisioning have become mainstream, enabling consumers to share resources in a public, private, or hybrid cloud. For service provisioning, interfaced "external systems" are required to complete a service provisioning workflow, which may require a deeper chain of external system communication for one or more application programming interface (API) calls. Multiple external systems, which are generally managed and maintained by different owners, need to be coordinated in order to complete end-to-end service provisioning. Some of the external systems may be legacy systems, such as change management or ticketing systems. If service provisioning fails, it may be difficult to perform a root cause analysis without back and forth discussion and negotiation with the involved parties. Additionally, even when a root cause is identified on a certain external system, service provisioning is interrupted for the time required to fix the issue and test the fix.

SUMMARY

A first aspect of the present invention discloses a method including one or more computer processors capturing one or more application programming interface (API) calls associated with a service provision. One or more computer processors submit the captured one or more API calls to a blockchain ledger. One or more computer processors detect a system failure during the service provision. One or more computer processors extract the submitted one or more API calls from the blockchain ledger. Based on the extracted one or more API calls, one or more computer processors identify a problematic system associated with the system failure.

A second aspect of the present invention discloses a computer program product including one or more computer readable storage media and program instructions collectively stored on the one or more computer readable storage media. The stored program instructions include program instructions to capture one or more application programming interface (API) calls associated with a service provision. The stored program instructions include program instructions to submit the captured one or more API calls to a blockchain ledger. The stored program instructions include program instructions to detect a system failure during the service provision. The stored program instructions include program instructions to extract the submitted one or more API calls from the blockchain ledger. Based on the extracted one or more API calls, the stored program instructions include program instructions to identify a problematic system associated with the system failure.

A third aspect of the present invention disclose a computer system including one or more computer processors and one or more computer readable storage media, where program instructions are collectively stored on the one or more computer readable storage media. The stored program instructions include program instructions to capture one or more application programming interface (API) calls associated with a service provision. The stored program instructions include program instructions to submit the captured one or more API calls to a blockchain ledger. The stored program instructions include program instructions to detect a system failure during the service provision. The stored program instructions include program instructions to extract the submitted one or more API calls from the blockchain ledger. Based on the extracted one or more API calls, the stored program instructions include program instructions to identify a problematic system associated with the system failure.

In another aspect, identifying the problematic system includes performing, by one or more computer processors, a root cause analysis of the system failure during, generating, by one or more computer processors, a report, wherein the report includes the root cause analysis, the problematic system, and at least one corrective action, and submitting, by one or more computer processors, the report to the blockchain ledger. Generating a report that includes a root cause analysis is advantageous because a user does not have to intervene in the process to determine a root cause of the failure. Submitting a report that includes a root cause analysis to the blockchain ledger is advantageous because a report on the blockchain ledger cannot be altered.

In yet another aspect, blockchain management of cloud service provisioning failures includes retrieving, by one or more computer processors, a smart contract associated with the problematic system and the service provision, receiving, by one or more computer processors, one or more API calls associated with the problematic system, and based on the smart contract, generating, by one or more computer processors, a dummy response to the one or more API calls associated with the problematic system. Retrieving a smart contract and generating a dummy response based on the retrieved smart contract is advantageous because responses from the problematic system appear to occur as the problem is fixed, enabling provisioning to be completed without delay.

DETAILED DESCRIPTION

Embodiments of the present invention recognize that efficiency may be gained by automatically capturing and storing inter-system communication data for each API call to an external system and saving the communications to a blockchain ledger to enable root cause analysis and problem owner identification. Embodiments of the present invention also implement proactive, automatic service provisioning failure analysis and identification based on data captured and stored in a blockchain ledger system for a complicated service provisioning. Embodiments of the present invention also provide a smart contract for responses from the problematic system to occur as the problem is fixed, enabling provisioning to be completed without delay. Implementation of embodiments of the invention may take a variety of forms, and exemplary implementation details are discussed subsequently with reference to the Figures.

Figure 1:
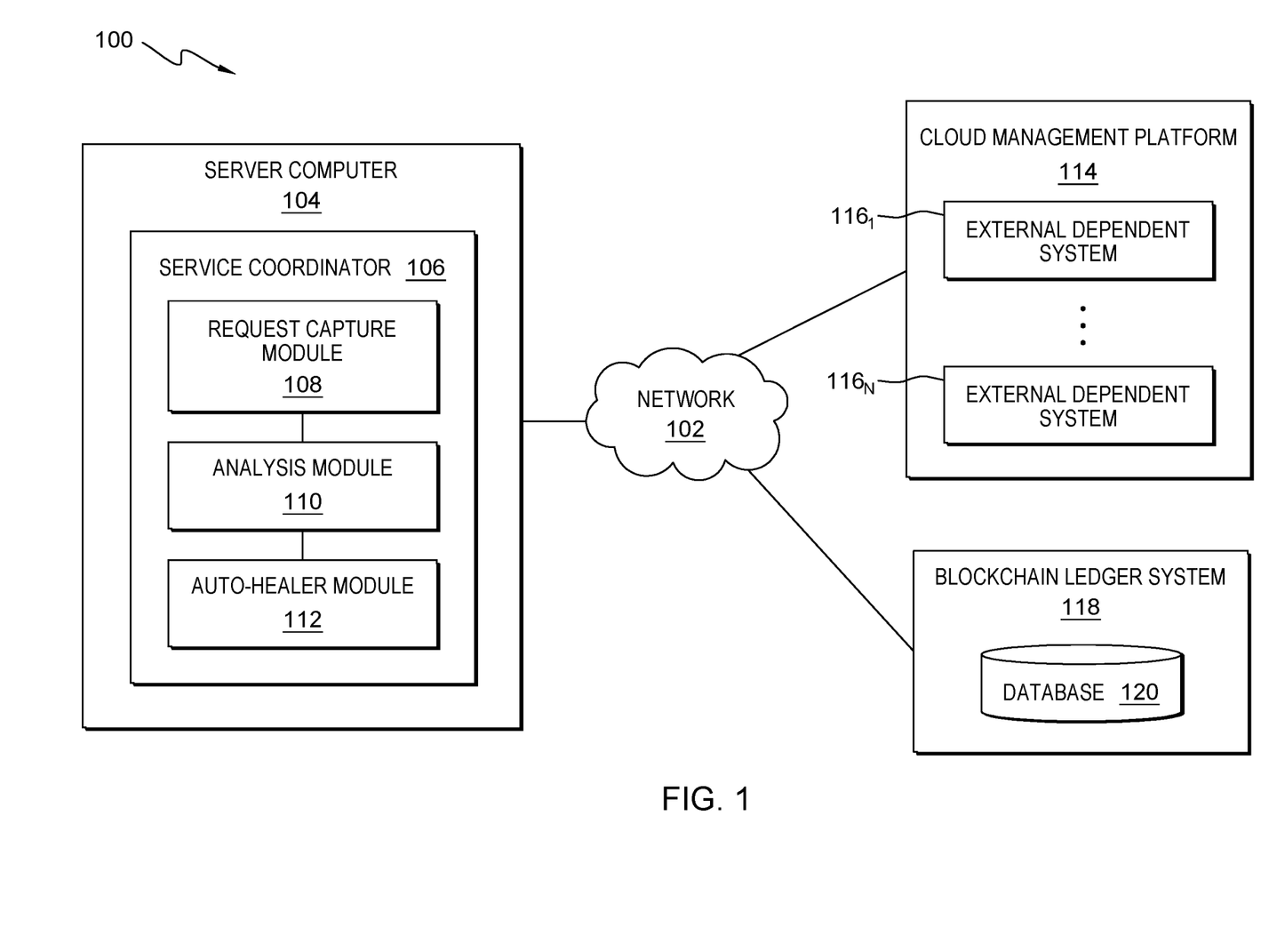
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, cloud management platform 114, and blockchain ledger system 118, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, cloud management platform 114, blockchain ledger system 118, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with cloud management platform 114, blockchain ledger system 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes service coordinator 106. Server computer 104 may include internal and external hardware components, as depicted and described in further detail with respect to FIG. 4.

Service coordinator 106 addresses current concerns with cloud management platform implementation for service provisioning required for interfacing with a plurality of external dependencies, such as systems and API calls, to fulfill a service request in case of a provisioning failure. Service coordinator 106 provides automatic service failure analysis and fact-based identification based on accurate data capture which is advantageous because it enables a quick corrective action to fix the provisioning failure. Service coordinator 106 also provides auto-healing of a service provisioning failure without service interruption or administrator intervention which is advantageous to achieve both service availability and delayed data consistency and completeness via post-provisioning data sync and update. After detecting a service provisioning execution workflow, service coordinator 106 captures API call data associated with the workflow and submits the captured data to a blockchain ledger. Service coordinator 106 detects a provisioning failure. Service coordinator 106 performs root cause analysis based on the captured data and identifies the problematic system. Service coordinator 106 submits the results of the root cause analysis to blockchain ledger system 118. Service coordinator 106 retrieves a smart contract associated with the problematic system. When service coordinator 106 receives incoming API calls for the problematic system, service coordinator 106 generates one or more dummy responses to the incoming API calls in order to prevent the service provisioning from stalling. Service coordinator 106 submits data associated with the incoming API calls into blockchain ledger system 118. Service coordinator 106 processes the data updates from the incoming API calls in order to complete the service provisioning. In the depicted embodiment, service coordinator 106 includes request capture module 108, analysis module 110, and auto-healer module 112. In another embodiment, the functions of one or more of request capture module 108, analysis module 110, and auto-healer module 112 are fully integrated into service coordinator 106. Service coordinator 106 is depicted and described in further detail with respect to FIG. 2.

In an embodiment, request capture module 108 continuously monitors the provisioning requests and execution, and captures data from system calls and responses to and from one or more external dependent systems, such as external dependent system 116​1-N. Request capture module 108 may also submit the captured data into blockchain ledger system 118.

In an embodiment, analysis module 110 extracts captured data from failed provisioning requests from blockchain ledger system 118 and performs a root cause analysis on the extracted data. Analysis module 110 may also generate an analysis report and submit the report into blockchain ledger system 118.

In an embodiment, auto-healer module 112 responds to API calls directed to the problematic system with a dummy response based on a smart contract, as well as directing the details of the API calls to blockchain ledger system 118. Auto-healer module 112 may also perform batch updates offline.

Cloud management platform 114 is a suite of software tools designed to manage cloud computing resources in a public, private, or hybrid cloud environment. A cloud management platform provides a means for a cloud service customer to manage the deployment and operation of applications and associated datasets across multiple cloud service infrastructures, including both on-premises cloud infrastructure and public cloud service provider infrastructure. A cloud management platform provides management capabilities for hybrid cloud and multi-cloud environments. A cloud management platform allows users to manage cloud resources through an orchestration suite that automates cloud management tasks. A cloud management platform can automate orchestration tasks, i.e., the cloud management platform can automatically administrate management tasks to help optimize resource usage. In the depicted embodiment, cloud management platform 114 resides on a server computer (not shown) within distributed data processing environment 100. In another embodiment, cloud management platform 114 may reside on server computer 104. Cloud management platform 114 includes external dependent system 116​1-N.

External dependent system 116​1-N, herein external dependent system(s) 116, may be one or more of a system used by cloud management platform 114 to respond to a service provisioning request. As used herein, N represents a positive integer, and accordingly a number of scenarios implemented in a given embodiment of the present invention is not limited to those depicted in FIG. 1. Examples of external dependent system(s) 116 include, but are not limited to, an IT change management system, a ticketing system, an IP address management system, a backup and restore system, etc. In the depicted embodiment, external dependent system(s) 116 reside within cloud management platform 114. In another embodiment, one or more of external dependent system(s) 116 may reside elsewhere within distributed data processing environment 100 provided cloud management platform 114 can access each of external dependent system(s) 116.

Blockchain ledger system 118 is one or more of a plurality of systems known in the art which can be used to store records of digital value, for example, transactions, identities, assets, documents, and properties, into an immutable ledger, or to add self-enforcing business logic to the ledger, such as smart contracts. The term "smart contract" refers to a digital entity that defines complex transaction logic and facilitates cross-organizational workflow including, but not limited to, storage of data, data access permissions, ordered workflow, and computation. Within the context of blockchain, smart contracts are scripts stored on the blockchain. Since they reside on the chain, smart contracts have a unique address. A smart contract is triggered by messages or transactions sent to its address. In one embodiment, blockchain ledger system 118 is permissionless, i.e., a public blockchain system open for participation to anyone. In another embodiment, blockchain ledger system 118 is permissioned, i.e., a private blockchain system available only to a closed group of participants. In the depicted embodiment, blockchain ledger system 118 resides outside of server computer 104. In another embodiment, blockchain ledger system 118 may reside on server computer 104 or elsewhere within distributed data processing environment 100, provided service coordinator 106 has access to blockchain ledger system 118. Blockchain ledger system 118 includes database 120.

Database 120 is a repository for data used by service coordinator 106. Database 120 can represent one or more databases. In the depicted embodiment, database 120 resides on blockchain ledger system 118. In another embodiment, database 120 may reside elsewhere within distributed data processing environment 100, provided service coordinator 106 has access to database 120. A database is an organized collection of data. Database 120 can be implemented with any type of storage device capable of storing data and configuration files that can be accessed and utilized by service coordinator 106, such as a database server, a hard disk drive, or a flash memory. Database 120 stores data associated with management of service provisioning failures collected and used by service coordinator 106. Database 120 may also store one or more smart contracts associated with external dependent system(s) 116. Database 120 may also store historical provisioning data. For example, historical provisioning data may include response data associated with previous service requests that were successfully completed, end-to-end, with no errors. Successful historical provisioning data may be useful for comparison to future service requests.

Figure 2:
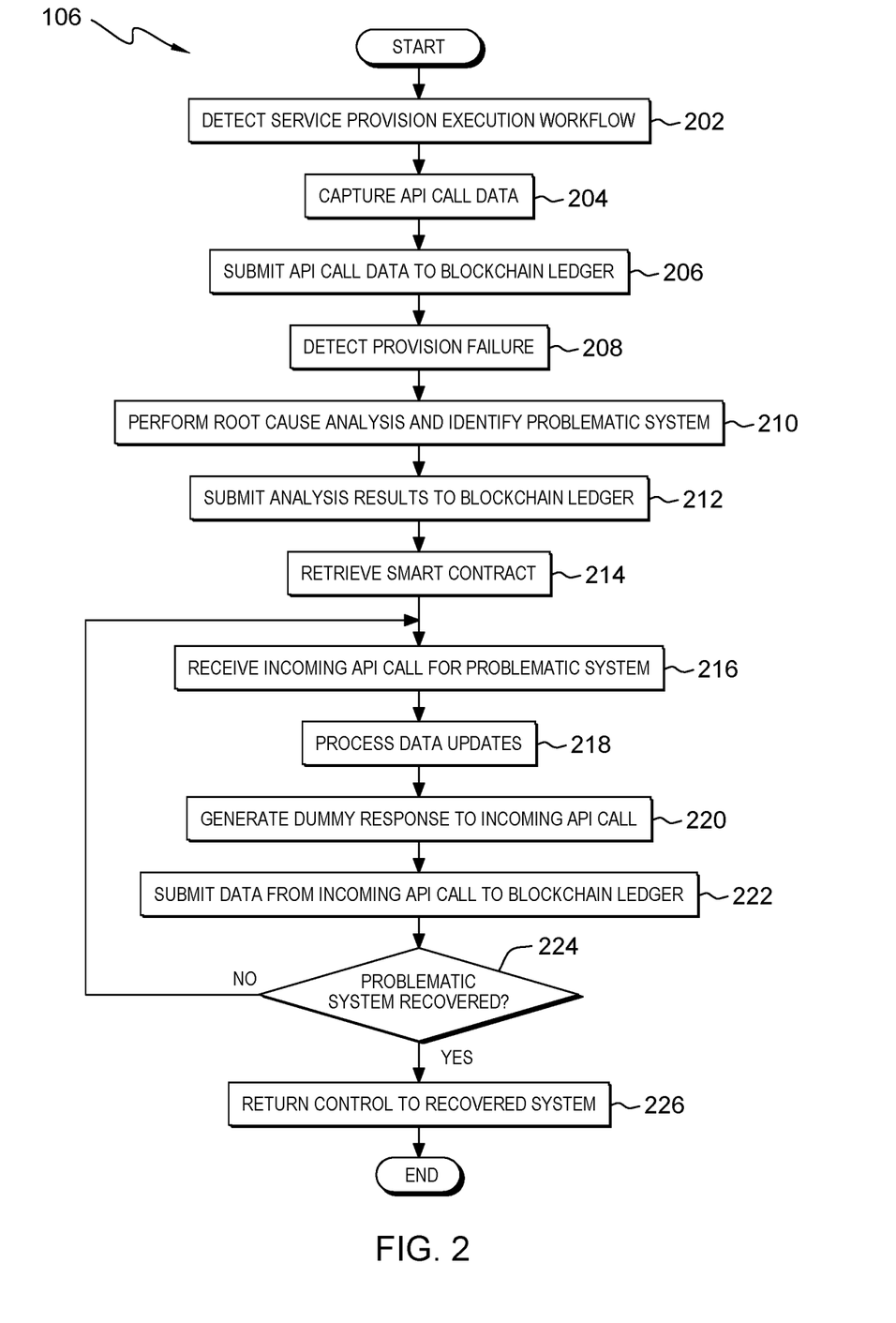
FIG. 2 is a flowchart depicting operational steps of a service coordinator, on a server computer within the distributed data processing environment of FIG. 1, for blockchain management of service provisioning failures, in accordance with an embodiment of the present invention.

FIG. 2 is a flowchart depicting operational steps of service coordinator 106, on server computer 104 within distributed data processing environment 100 of FIG. 1, for blockchain management of service provisioning failures, in accordance with an embodiment of the present invention.

Service coordinator 106 detects a service provisioning execution workflow (step 202). In an embodiment, when a user needs a service provisioning, the user submits a request to cloud management platform 114, which, in turn, triggers API calls to and from external dependent system(s) 116. In an embodiment, service coordinator 106 receives a notification from cloud management platform 114, via network 102, that cloud management platform 114 is initiating a workflow execution of the service provisioning request. In another embodiment, service coordinator 106 may receive the request directly from the user and pass the request to cloud management platform 114, via network 102. In an embodiment, request capture module 108 detects the service provisioning request and execution workflow. In an embodiment, upon detecting a service provisioning execution workflow, service coordinator 106 begins to continuously monitor and capture system calls and system responses from external dependent system(s) 116. In another embodiment, service coordinator 106 begins to continuously monitor and capture system calls and system responses from external dependent system(s) 116 via request capture module 108.

Service coordinator 106 captures API call data (step 204). In an embodiment, in response to detection of the service provisioning execution workflow, service coordinator 106 begins to continuously monitor and capture API call data to and from external dependent system(s) 116. API call data may include, but is not limited to, inter-system communication data, a timestamp associated with the system failure, one or more responses from external dependent system(s) 116, service call parameters, etc. In an embodiment, upon detection of the service provisioning execution workflow, request capture module 108 begins to continuously monitor and capture API call data from external dependent system(s) 116. In an embodiment, service coordinator 106 captures API call data via request capture module 108. In an embodiment, in addition to the API call data, service coordinator 106 captures data associated with the service provisioning request. For example, service coordinator 106 may capture a request ID, request parameters, and/or the tenant or user from which the request is received.

Service coordinator 106 submits the captured API call data to blockchain ledger system 118 (step 206). In an embodiment, as service coordinator 106 captures API call data, service coordinator 106 submits the captured API call data to blockchain ledger system 118. In an embodiment, service coordinator 106 submits the captured API call data to blockchain ledger system 118 in chronological order. In an embodiment, service coordinator 106 stores the captured API call data in database 120. In an embodiment, service coordinator 106 combines the newly captured data with historical provisioning data stored in database 120. In an embodiment, service coordinator 106 submits API call data to blockchain ledger system 118 via request capture module 108.

Service coordinator 106 detects a provisioning failure (step 208). In an embodiment, service coordinator 106 receives a notification from cloud management platform 114 indicating that one or more of external dependent system(s) 116 are experiencing a failure in the provisioning execution. In another embodiment, service coordinator 106 detects a failure in provisioning execution directly from external dependent system(s) 116. In an embodiment, service coordinator 106 continuously monitors system calls and system responses from external dependent system(s) 116 and can determine, based on the content of the responses, that at least one of external dependent system(s) 116 are experiencing a failure. In an embodiment, service coordinator 106 detects a provisioning failure via request capture module 108.

Service coordinator 106 performs a root cause analysis and identifies a problematic system (step 210). In an embodiment, service coordinator 106 extracts the captured API call data from blockchain ledger system 118 and analyzes the captured API call data to determine a root cause of the provisioning failure. In an embodiment, service coordinator 106 extracts the captured data as well as historical provisioning data and compares the two conditions, i.e., success versus failure, enabling a conclusion of a root cause. In an embodiment, service coordinator 106 performs the root cause analysis via analysis module 110. When service coordinator 106 completes the analysis, service coordinator 106 identifies one or more problematic systems of external dependent system(s) 116. In an embodiment, service coordinator 106 identifies the one or more problematic systems of external dependent system(s) 116 via analysis module 110. In an embodiment, service coordinator 106 identifies one or more corrective actions needed to rectify the provisioning failure of the problematic system.

Service coordinator 106 submits analysis results to blockchain ledger system 118 (step 212). In an embodiment, service coordinator 106 generates a failure analysis report that includes the root cause analysis and submits the report to blockchain ledger system 118. Generating a report that includes a root cause analysis is advantageous because a user does not have to intervene in the process to determine a root cause of the failure. Submitting a report that includes a root cause analysis to the blockchain ledger is advantageous because a report on the blockchain ledger cannot be altered. In an embodiment, the report includes one or more corrective actions. In an embodiment, service coordinator 106 notifies the owners of the one or more problematic systems. In the embodiment, the notification includes the generated report. For example, service coordinator 106 may notify the owner of a problematic system by sending an email or text message that includes the generated report. In another example, service coordinator 106 may notify the owner of a problematic system by sending an email or text message with a link to view the report on blockchain ledger system 118. In an embodiment, service coordinator 106 submits the analysis results and generates a report via analysis module 110.

Service coordinator 106 retrieves a smart contract (step 214). In an embodiment, service coordinator 106 retrieves a smart contract associated with the problematic system from database 120. In an embodiment, the retrieved smart contract defines an agreement between the owner of the problematic system and cloud management platform 114. For example, the system owner may have agreed to assign responsibility to service coordinator 106 for responding to incoming requests, such as API calls, without actually processing the request if the system experiences a failure, such as a performance issue, during the service provisioning process. In an embodiment, when service coordinator 106 retrieves the smart contract, service coordinator 106 triggers auto-healer module 112 to implement the requirements of the smart contract.

Service coordinator 106 receives an incoming API call for the problematic system (step 216). In an embodiment, as cloud management platform 114 continues to execute the provisioning request workflow, service coordinator 106 receives one or more incoming API calls for the previously identified problematic system. In an embodiment, service coordinator 106 receives an incoming API call for the problematic system via auto-healer module 112.

Service coordinator 106 processes data updates (step 218). In an embodiment, based on the incoming API call data, service coordinator 106 starts the data updates from the request calls that cannot be processed by the problematic system. In an embodiment, service coordinator 106, via auto-healer module 112, receives the unprocessed call details and parses the data into various actions, as needed, based on the smart contract. For example, service coordinator 106, via auto-healer module 112, may update a table of a backend database associated with the problematic system. In another example, service coordinator 106, via auto-healer module 112, may insert a record into a legacy system. In an embodiment, auto-healer module 112 performs batch updates offline to achieve a final consistency for each provisioning request. In an embodiment, processing data updates includes generating and/or identifying non-synced data for processing later by the problematic system. By processing the data updates, service coordinator 106 prevents service interruption and a need for intervention that the problematic system may have caused.

Service coordinator 106 generates a dummy response to the incoming API call (step 220). In an embodiment, service coordinator 106 generates a dummy response to the incoming API call based on the retrieved smart contract. Retrieving a smart contract and generating a dummy response based on the retrieved smart contract is advantageous because responses from the problematic system appear to occur as the problem is fixed, enabling provisioning to be completed without delay. In another embodiment, service coordinator 106 generates a dummy response to the incoming API call based on the content of the root cause analysis. In a further embodiment, service coordinator 106 generates a dummy response to the incoming API call based on both the retrieved smart contract and the root cause analysis. For example, the dummy response may be "dummy ok." In another example, the dummy response may be "to be processed data." Further, as would be recognized by a person of skill in the art, HTTP defines forty standard status codes that can be used to convey the results of a user request. The status codes are divided into five categories, and "2xx Success" indicates that the request of the user was successfully executed. For example, the dummy response may be "200 (OK)", which indicates that a REST API call successfully carried out the requested action. In another example, the dummy response may be "201 (Created)", indicating a resource was created, such as resulting from a controller action. In an embodiment, service coordinator 106, via auto-healer module 112, acts as a mock system or a simulator of the problematic system, and for each new system call, service coordinator 106 responds as if the system call is completed by the problematic system. The dummy response enables the service provisioning to be completed since the problematic system does not hold up the provisioning workflow.

Service coordinator 106 submit data from the incoming API call to blockchain ledger system 118 (step 222). In an embodiment, service coordinator 106 collects the data associated with the one or more incoming API calls, i.e., unprocessed call details, and submits the data to blockchain ledger system 118. The data may include details of the API calls, such as the API name and associated parameters, a system ID, a timestamp, an error code, an error message, an error log, and other request/response examples of REST API calls, as would be recognized by a person of skill in the art. In an embodiment, service coordinator 106 submits the data into blockchain ledger system 118 via auto-healer module 112. In an embodiment, service coordinator 106 inserts the data into database 120. In an embodiment, in addition to the incoming API call data, service coordinator 106 submits the generated dummy responses to blockchain ledger system 118 with the associated API call data. In an embodiment, in addition to the incoming API call data, service coordinator 106 submits any data associated with a processed update to blockchain ledger system 118 with the associated API call data.

Service coordinator 106 determines whether the problematic system has recovered (decision block 224). Based on monitoring the status of the problematic system, service coordinator 106 determines whether the problematic system has recovered from the detected failure. In an embodiment, service coordinator 106 receives a notification from the owner of the problematic system indicating that the issue has been fixed and tested.

If service coordinator 106 determines the problematic system has not recovered ("no" branch, decision block 224), then service coordinator 106 returns to step 216 to continue to receive incoming API calls for the problematic system.

If service coordinator 106 determines the problematic system has recovered ("yes" branch, decision block 224), then service coordinator 106 returns control to the recovered system (step 226). In an embodiment, in response to the recovery of the problematic system, service coordinator 106 stops submitting API call data to blockchain ledger system 118 and disables the simulator from responding to the API calls. In one embodiment, service coordinator 106 stops request capture module 108 from submitting the API calls to blockchain ledger system 118. In one embodiment, service coordinator 106 disables auto-healer module 112 from acting as a simulator. In one embodiment, service coordinator 106 continues to submit API calls to blockchain ledger system 118 in order to capture more successful data to add to historical provisioning data stored in database 120.

Figure 3:
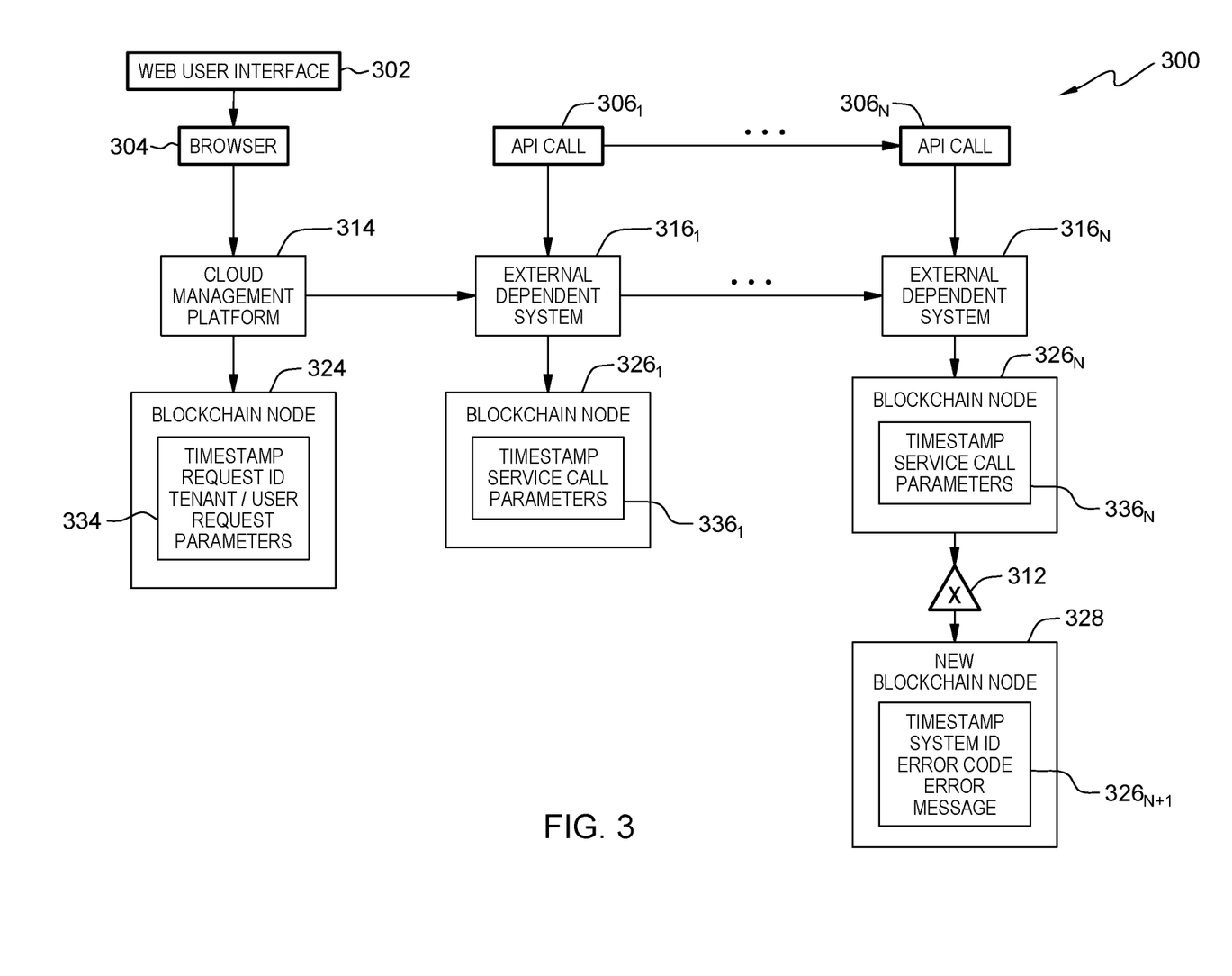
FIG. 3 illustrates an example of operational steps of the service coordinator, on the server computer within the distributed data processing environment of FIG. 1, in accordance with an embodiment of the present invention.

FIG. 3 illustrates example 300 of operational steps of service coordinator 106, on server computer 104 within distributed data processing environment 100 of FIG. 1, in accordance with an embodiment of the present invention. Example 300 represents both the hierarchical layers of the system call and a time sequence. Example 300 includes web user interface 302, browser 304, API call 306 1-N, herein API call(s) 306, cloud management platform 314 (which represents cloud management platform 114 of FIG. 1), and external dependent system 316 1-N, herein external dependent system(s) 316 (which represent external dependent system(s) 116 of FIG. 1). As discussed with respect to step 202 of FIG. 2, when a user needs a service provisioning, the user submits a request from web user interface 302, also known as a user portal, via browser 304, to cloud management platform 314, which, in turn, triggers API call(s) 306 to and from external dependent system(s) 316.

To facilitate any problem or failure analysis during the service provisioning, service coordinator 106 submits data associated with the service provisioning request from cloud management platform 314 to blockchain node 324, as would be found on blockchain ledger system 118 of FIG. 1. Data types 334 are examples of data submitted to blockchain node 324 and include a timestamp, a request ID, a tenant and/or user, and request parameters. In addition, as the service provisioning workflow execution progresses, service coordinator 106 submits data associated with external dependent system(s) 316 to blockchain node 326 1-N, herein blockchain node(s) 326 on blockchain ledger system 118 of FIG. 1. Data types 336 1-N are examples of data submitted to blockchain node(s) 326 include a timestamp and service call parameters. Event 312 represents service coordinator 106 detecting a provisioning failure on external dependent system $316_N$, as discussed with respect to step 204 of FIG. 2. Service coordinator 106 captures and submits data associated with the provisioning failure, shown as new blockchain node 328, to blockchain ledger system 118 of FIG. 1, as discussed with respect to steps 206 and 208 of FIG. 2. Data types $336N_{+1}$ are examples of data submitted to new blockchain node 328 and include a timestamp, a system ID, an error code, and an error message. Service coordinator 106 continuously adds new blockchain nodes to blockchain ledger system 118 until the problematic system, i.e., external dependent system $316_N$, is identified and service coordinator 106 determines a root cause of the provisioning failure, as discussed with respect to steps 210 and 212 of FIG. 2.

Figure 4:
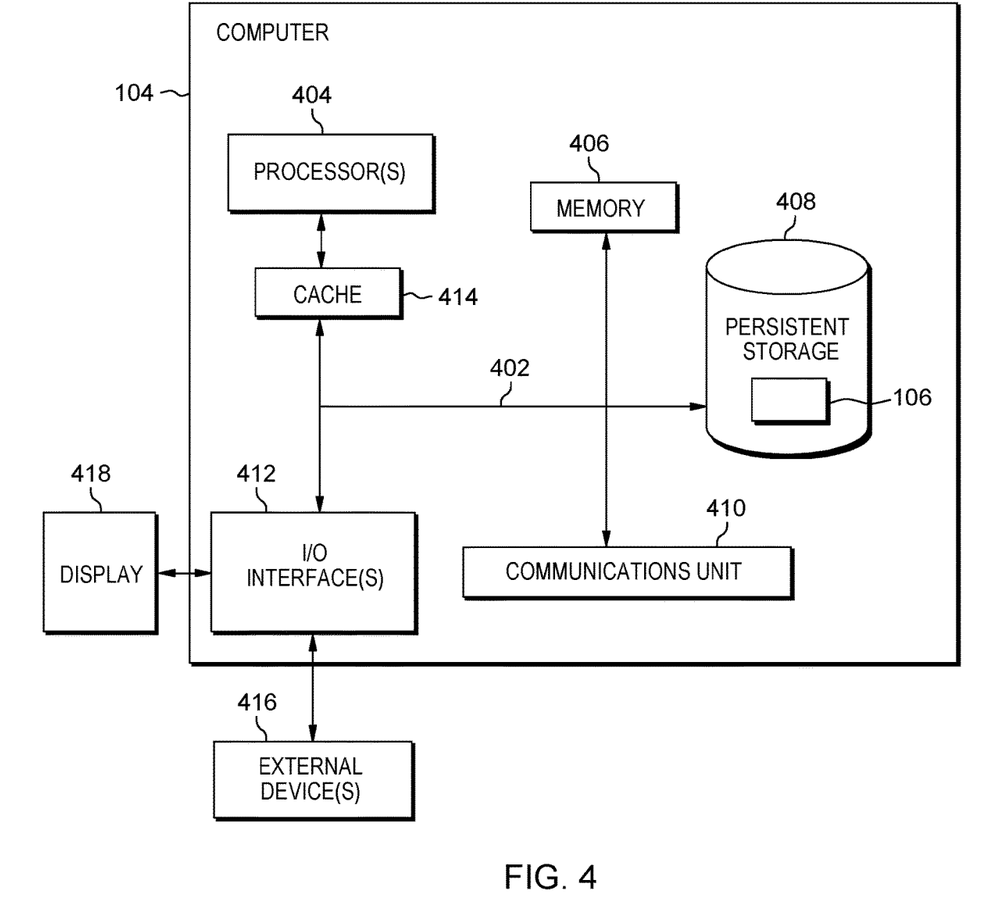
FIG. 4 depicts a block diagram of components of the server computer executing the service coordinator within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., service coordinator 106, is stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of cloud management platform 114 and blockchain ledger system 118. In these examples, communications unit 410 includes one or more network interface cards. Communications unit 410 may provide communications through the use of either or both physical and wireless communications links. Service coordinator 106, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., service coordinator 106 on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
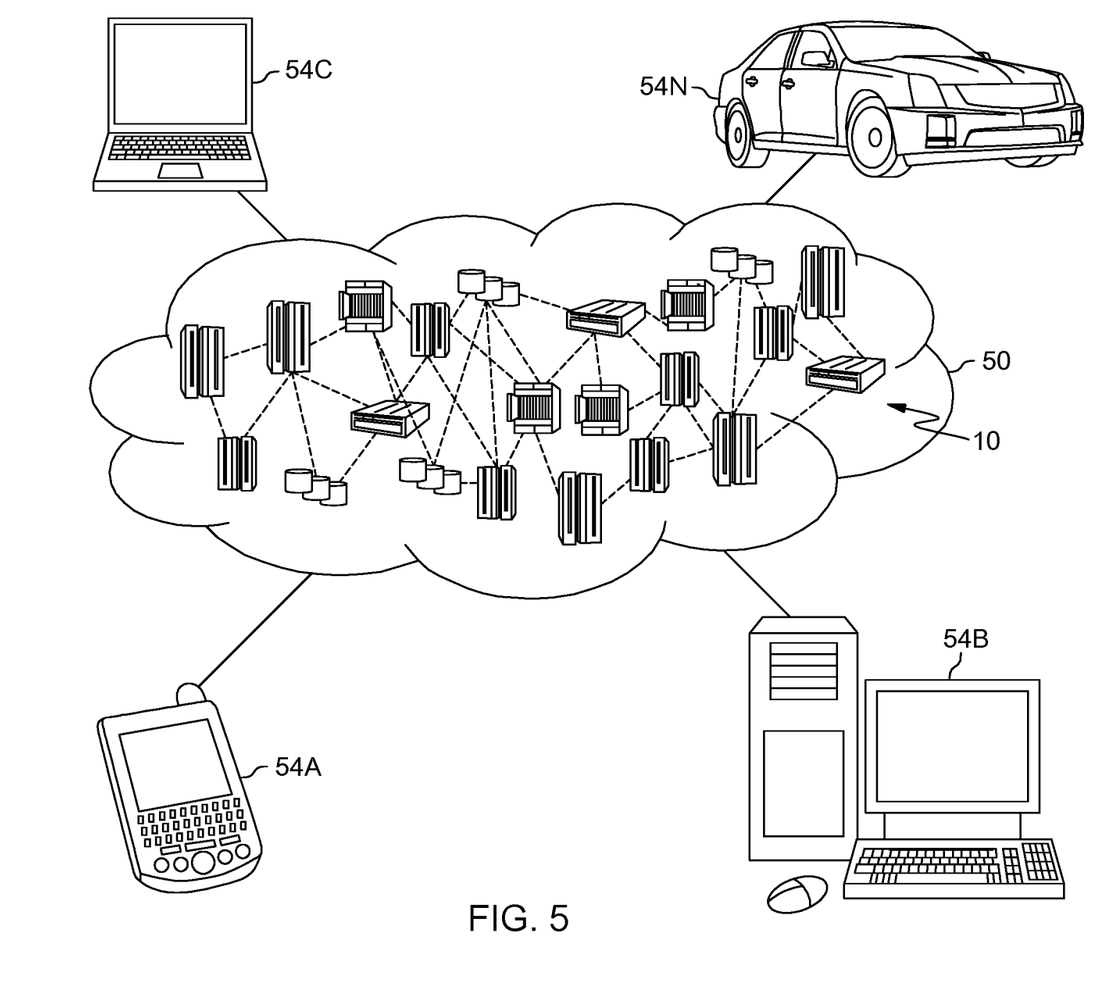
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
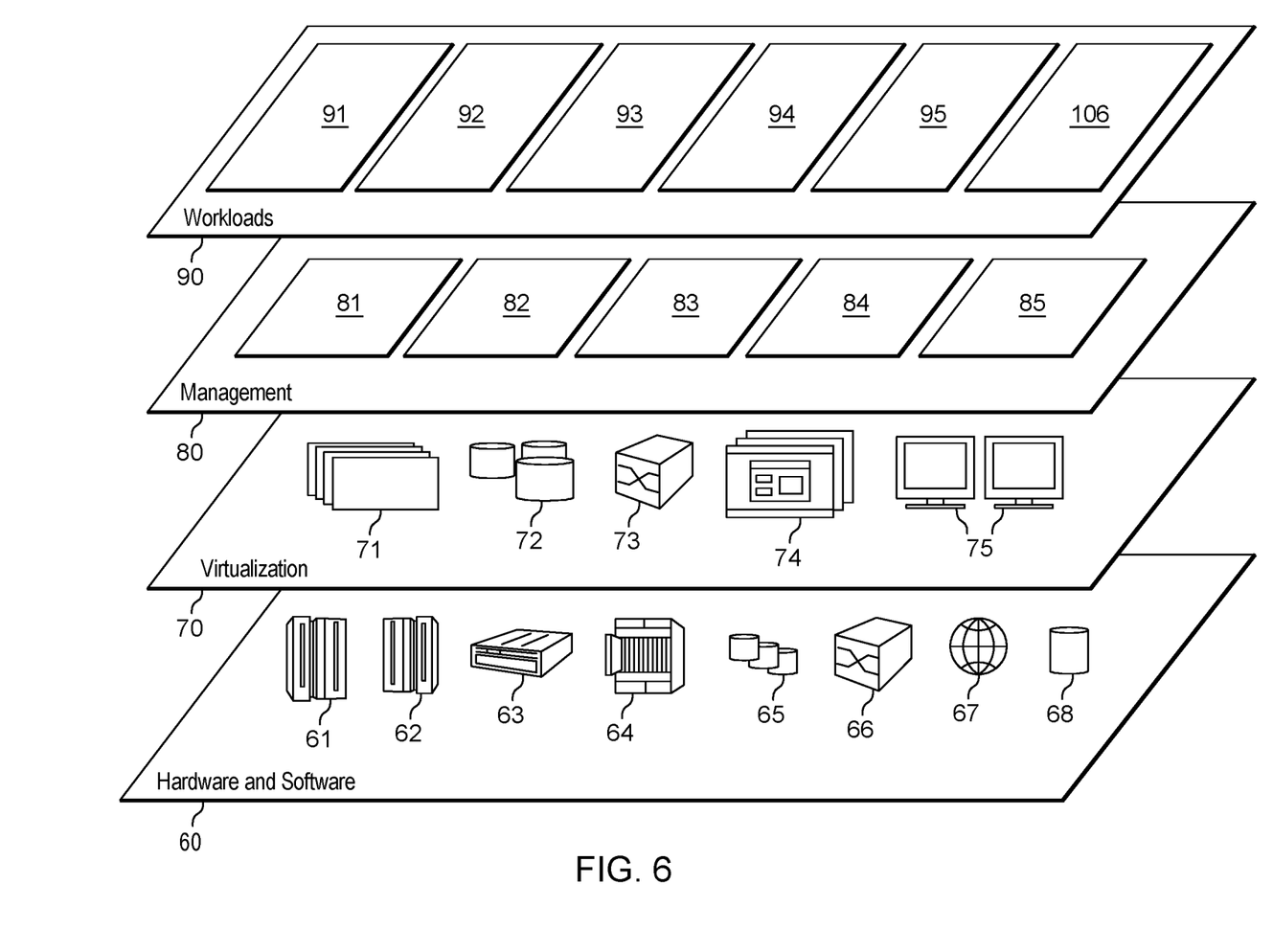
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service coordinator 106.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    monitoring, by one or more computer processors, one or more external systems used by a cloud management platform to respond to a request for a cloud service provisioning;
    capturing, by one or more computer processors, data associated with one or more application programming interface (API) calls associated with the cloud service provisioning made by the one or more external systems;
    submitting, by one or more computer processors, the captured data associated with the one or more API calls to a blockchain ledger;
    detecting, by one or more computer processors, a system failure of at least one of the one or more external systems during the cloud service provisioning;

extracting, by one or more computer processors, the submitted data associated with the one or more API calls from the blockchain ledger; and based on the extracted data associated with the one or more API calls, identifying, by one or more computer processors, a problematic system of the at least one of the one or more external systems associated with the system failure.

2. The method of claim 1, wherein identifying the problematic system further comprises:

performing, by one or more computer processors, a root cause analysis of the system failure during the cloud service provisioning;

generating, by one or more computer processors, a report, wherein the report includes the root cause analysis, the problematic system, and at least one corrective action; and submitting, by one or more computer processors, the report to the blockchain ledger.

3. The method of claim 2, further comprising, notifying, by one or more computer processors, an owner of the problematic system.

4. The method of claim 1, further comprising:

retrieving, by one or more computer processors, a smart contract associated with the problematic system and the cloud service provisioning;

receiving, by one or more computer processors, one or more API calls associated with the problematic system; and based on the smart contract, generating, by one or more computer processors, a dummy response to the one or more API calls associated with the problematic system.

5. The method of claim 4, further comprising, submitting, by one or more computer processors, the one or more API calls associated with the problematic system to the blockchain ledger.

6. The method of claim 4, further comprising:

processing, by one or more computer processors, one or more unprocessed call details associated with the one or more API calls associated with the problematic system; and parsing, by one or more computer processors, the one or more unprocessed call details into one or more actions, based on the smart contract.

7. The method of claim 1, further comprising, prior to detecting the system failure, detecting, by one or more computer processors, a cloud service provisioning workflow execution.

8. A computer program product comprising:

one or more computer readable storage media and program instructions collectively stored on the one or more computer readable storage media, the stored program instructions comprising:

program instructions to monitor one or more external systems used by a cloud management platform to respond to a request for a cloud service provisioning;

program instructions to capture data associated with one or more application programming interface (API) calls associated with the cloud service provisioning made by the one or more external systems;

program instructions to submit the captured data associated with the one or more API calls to a blockchain ledger;

program instructions to detect a system failure of at least one of the one or more external systems during the cloud service provisioning;

program instructions to extract the submitted data associated with the one or more API calls from the blockchain ledger; and based on the extracted data associated with the one or more API calls, program instructions to identify a problematic system of the at least one of the one or more external systems associated with the system failure.

9. The computer program product of claim 8, wherein the program instructions to identify the problematic system comprise:

program instructions to perform a root cause analysis of the system failure during the cloud service provisioning;

program instructions to generate a report, wherein the report includes the root cause analysis, the problematic system, and at least one corrective action; and program instructions to submit the report to the blockchain ledger.

10. The computer program product of claim 9, the stored program instructions further comprising, program instructions to notify an owner of the problematic system.

11. The computer program product of claim 8, the stored program instructions further comprising:

program instructions to retrieve a smart contract associated with the problematic system and the cloud service provisioning;

program instructions to receive one or more API calls associated with the problematic system; and based on the smart contract, program instructions to generating a dummy response to the one or more API calls associated with the problematic system.

12. The computer program product of claim 11, the stored program instructions further comprising, program instructions to submit the one or more API calls associated with the problematic system to the blockchain ledger.

13. The computer program product of claim 11, the stored program instructions further comprising:

program instructions to process one or more unprocessed call details associated with the one or more API calls associated with the problematic system; and program instructions to parse the one or more unprocessed call details into one or more actions, based on the smart contract.

14. The computer program product of claim 8, the stored program instructions further comprising, prior to detecting the system failure, program instructions to detect a cloud service provisioning workflow execution.

15. A computer system comprising:

one or more computer processors;

one or more computer readable storage media;

program instructions collectively stored on the one or more computer readable storage media for execution by at least one of the one or more computer processors, the stored program instructions comprising:

program instructions to monitor one or more external systems used by a cloud management platform to respond to a request for a cloud service provisioning;

program instructions to capture data associated with one or more application programming interface (API) calls associated with the cloud service provisioning made by the one or more external systems;

program instructions to submit the captured data associated with the one or more API calls to a blockchain ledger;

program instructions to detect a system failure of at least one of the one or more external systems during the cloud service provisioning;

program instructions to extract the submitted data associated with the one or more API calls from the blockchain ledger; and based on the extracted data associated with the one or more API calls, program instructions to identify a problematic system of the at least one of the one or more external systems associated with the system failure.

16. The computer system of claim 15, wherein the program instructions to identify the problematic system comprise:

program instructions to perform a root cause analysis of the system failure during the cloud service provisioning;

program instructions to generate a report, wherein the report includes the root cause analysis, the problematic system, and at least one corrective action; and program instructions to submit the report to the blockchain ledger.

17. The computer system of claim 16, the stored program instructions further comprising, program instructions to notify an owner of the problematic system.

18. The computer system of claim 15, the stored program instructions further comprising:

program instructions to retrieve a smart contract associated with the problematic system and the cloud service provisioning;

program instructions to receive one or more API calls associated with the problematic system; and based on the smart contract, program instructions to generating a dummy response to the one or more API calls associated with the problematic system.

19. The computer system of claim 18, the stored program instructions further comprising, program instructions to submit the one or more API calls associated with the problematic system to the blockchain ledger.

20. The computer system of claim 18, the stored program instructions further comprising:

program instructions to process one or more unprocessed call details associated with the one or more API calls associated with the problematic system; and program instructions to parse the one or more unprocessed call details into one or more actions, based on the smart contract.

* * * * *